| United States Patent [19] | [11] | 4,398,015 |
|---|---|---|
| Frazer | [45] | Aug. 9, 1983 |

[54] FIBER-FORMING POLYESTERS OF AROMATIC KETOHYDROXY ACIDS

[75] Inventor: August H. Frazer, Wilmington, Del.

[73] Assignee: E. I. Du Pont de Nemours & Company, Wilmington, Del.

[21] Appl. No.: 404,871

[22] Filed: Aug. 3, 1982

[51] Int. Cl.³ .............................................. C08G 63/06
[52] U.S. Cl. .................................... 528/125; 528/128
[58] Field of Search .............. 528/125, 128, 220, 271, 528/190, 191, 193, 194

[56] References Cited

U.S. PATENT DOCUMENTS

| 3,073,866 | 1/1963 | Stanley | 260/591 |
|---|---|---|---|
| 4,102,864 | 7/1978 | Deex et al. | 528/173 |
| 4,118,372 | 10/1978 | Schaefgen | 528/190 |
| 4,188,476 | 2/1980 | Irwin | 528/128 |
| 4,226,970 | 10/1980 | Frazer | 528/128 |
| 4,232,143 | 11/1980 | Irwin | 528/128 |
| 4,232,144 | 11/1980 | Irwin | 528/128 |
| 4,245,082 | 1/1981 | Irwin | 528/128 |
| 4,269,965 | 5/1981 | Irwin | 528/128 |
| 4,276,226 | 6/1981 | Clement et al. | 260/410.5 |
| 4,335,232 | 6/1982 | Irwin | 528/128 |

Primary Examiner—Lester L. Lee

[57] ABSTRACT

Homopolyesters and copolyesters of specific ketohydroxy acids and which exhibit melt-anisotropy and are melt-spinnable into oriented filaments that can be heat treated to high tenacity.

9 Claims, No Drawings

FIBER-FORMING POLYESTERS OF AROMATIC KETOHYDROXY ACIDS

DESCRIPTION

TECHNICAL FIELD

This invention relates to fiber-forming melt-processable polyesters that exhibit optical anisotropy in the melt.

BACKGROUND

Aromatic polyesters that form optically anisotropic melts and can be melt-spun into oriented fibers are known in the art. For example, U.S. Pat. No. 4,232,144 discloses such polyesters which consist essentially of p-oxybenzoyl units or the 3-methyl or 3-chloro derivatives thereof, 4-oxy-3'-carbonyloxybenzophenone units or the 3-methyl or 3-chloro derivatives thereof, and equimolar amounts of 1,4-phenylenedioxy units and terephthaloyl units. U.S. Pat. No. 4,279,803 discloses such polyesters which consist essentially of substantial amounts of 3- and/or 2-phenyl-4-oxybenzoyl moieties and 4-oxybenzoyl and/or 6-oxy-2-naphthoyl moieties.

It is an object of this invention to provide novel polyesters. Another object is to provide such polymers that form anisotropic melts and that can be melt-spun into filaments which can be heat strengthened to high tenacity. Other objects will become apparent hereinafter.

DISCLOSURE OF INVENTION

For further comprehension of the invention and of the objects and advantages thereof, reference may be made to the following description and to the appended claims in which the various novel features of the invention are more particularly set forth.

The invention resides in homopolyesters and copolyesters consisting essentially of the following amounts of recurring units of the structural formulas:

(a) 25–100 mol %

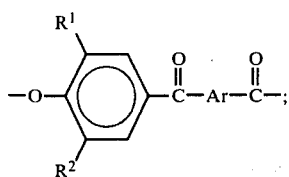

and (b) 0–75 mol %, preferably 40–60 mol %,

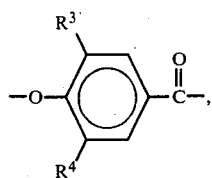

preferably oxybenzoyl;
wherein
both of $R^1$ and $R^2$ are H, $CH_3$ or Cl or $R^1$ is H and $R^2$ is $CH_3$ or Cl;
both of $R^3$ and $R^4$ are H, $CH_3$ or Cl or $R^3$ is H and $R^4$ is $CH_3$ or Cl; and
Ar is m- or p-phenylene,
provided, however, when the amount of (a) is 90–100 mol %, Ar is m-phenylene in at least 30% of the (a) units, and provided further, however, when the amount of (a) is 100 mol % and only one species of (a) is present, $R^1$ and $R^2$ are both Cl, and provided still further, however, in copolyesters consisting essentially of two or more different species of (a), only one of said species is substituted and $R^1$ and $R^2$ therein are Cl.

As the terms are used herein, "homopolyester" means the condensation polymer, of the invention, that consists essentially of 100 mol % of repeat units (a), with all repeat units being the same, and "copolyester" means the condensation polymer, of the invention, that consists essentially of two or more different species of (a) or consists essentially of either a single or two or more different species of (a) and at least one species of (b). The term "polyester" includes both homopolyester and copolyester.

As the term is used herein, "consisting essentially of" means that the polyester of the invention includes the recited essential recurring units. This definition is not intended to preclude the presence of other recurring units which do not deleteriously affect the properties, and particularly, the melt-anisotropic behavior, of the polyester. Minor amounts (less than 10 mol %) of common polyester units such as

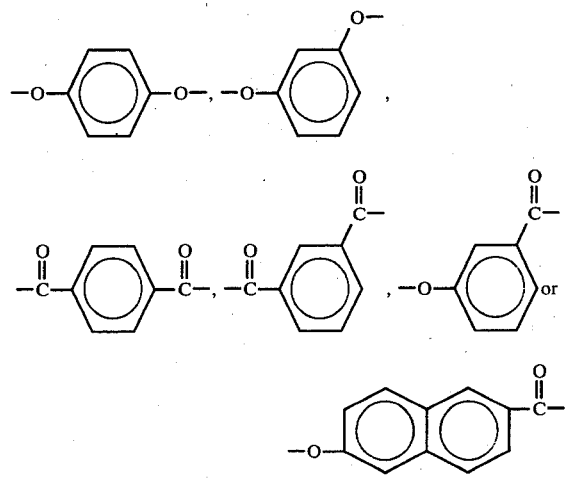

may be included to modify melting points or other properties, for example, ease of processing, provided said units do not adversely affect melt-anisotropy. If diacyl and dioxy units are included, these moieties are present in substantially equimolar amounts.

This invention also resides in shaped articles of the aforesaid homopolyesters and copolyesters, including molded and extruded articles, examples of the latter being films and filaments.

Also provided by this invention are melt-spun oriented filaments of selected polyesters having, after heat treatment, tenacities exceeding 15 g/denier and moduli of at least 400 g/denier.

One skilled in the art will readily understand that many of the aforesaid (a) and (b) units are readily available from known compounds. For example, the oxy moieties can be provided by the corresponding phenols or acylated phenols, the acyl group being hydrocarbylcarbonyl wherein the hydrocarbyl moiety contains 1 to 10 carbon atoms. Acetyl generally is the preferred acyl group. The carbonyl moieties in (a) units can be provided by the corresponding carboxylic acid.

Preparative procedures for the phenolic and acylated phenolic carboxylic acids which provide the (a) units can be formulated on the basis of the following example.

At an elevated temperature, terephthalic or isophthalic acid is reacted in liquid anhydrous hydrogen fluoride (HF) in the presence of boron trifluoride (BF$_3$) with the phenol of the formula

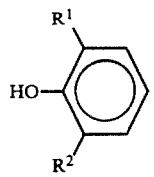

wherein both of R$^1$ and R$^2$ are H, CH$_3$ or Cl or R$^1$ is H and R$^2$ is CH$_3$ or Cl. Although the reactants combine in substantially equimolar amounts, it is preferable to employ a 3- to 6-fold molar excess of the acid over the phenol. BF$_3$ is added and the mixture is charged to an autoclave containing a several-fold molar excess of HF and heated at 10° to 100° C., preferably 20° to 60° C., for a period of 1 to 10 hours, typically about 4 hours. As an example, phenol (24 g, 0.25 mol), isophthalic acid (166 g, 1.0 mol) and BF$_3$ (51 g, 0.75 mol) were reacted in HF (400 g, 20 mols) for 4 hours at 30° C. The solid obtained after the HF/BF$_3$ had fumed off was washed with water, to remove inorganic acids, and then dispersed in a blender with water, neutralized to pH 8 with sodium bicarbonate. The bulk of the solid dissolved. The solution was filtered, to remove nonacidic material, and then carefully acidified with concentrated hydrochloric acid to obtain a solid which was collected by filtration, washed with water and dried; 29.9 g (49% based on phenol) of impure 3-carboxy-4'-hydroxybenzophenone was obtained as a tan powder.

The substituted benzophenone product was purified by crystallization from acetic acid (500 mL), then from acetic acid/water, 300 mL/300 mL, and finally from acetic acid/water, 250 mL/300 mL. It was obtained as ivory-colored needles, m.p. 239.5°–240.0° C., in 41% recovery. Elemental analysis results were consistent with the structure for 3-carboxy-4'-hydroxybenzophenone. Optionally, but preferably, the ketohydroxy acids and hydroxy acids which provide units (a) and (b), respectively, are polymerized as their acyloxy esters, preferably the acyl moiety being acetyl, which are prepared by reacting the hydroxy acid with the appropriate carboxylic acid anhydride, for example, acetic anhydride.

The polyesters of this invention are capable of forming optically anisotropic melts and exhibit molecular weights and melting points which permit melt-processing into filaments or shaped articles at temperatures below 400° C. Preferred polyesters of the invention have been melt-spun into filaments which have shown approximately 4-fold increases in tenacity after heat treatment (Example 1B).

The polyesters can be prepared by standard melt polymerization techniques from the aforesaid hydroxy acids or their acyloxy esters. The hydroxy acids are normally homopolymerized, or copolymerized with the necessary co-reactants in the aforesaid molar amounts desired in the product, by heating in a reaction vessel under nitrogen with stirring for about 4 to 24 hours, preferably 10 to 20 hours. Optionally, the polymerization (condensation) can be interrupted and the partially polymerized reaction mass can be ground at a temperature below −100° C. to a particle size of less than 20 mesh (U.S. Sieve Series) before resuming melt polymerization.

Temperatures employed for the polymerization should be above the melting point(s) of the reactant(s) and are generally in the range of 200° to 350° C. The reaction vessel is equipped with means to permit byproduct removal while polymerization takes place. A vacuum is normally applied towards the end of the polymerization to facilitate removal of remaining by-products and to complete the polymerization. Polymerization conditions, such as temperature, duration of heating and pressure, can be varied in accordance with known techniques in the light of the reactants employed and the degree of polymerization desired.

The polyesters can be spun into filaments by conventional melt-spinning techniques. Such techniques are described, for example, in U.S. Pat. No. 4,066,620. Typically, a melt of the polymer is extruded through a spinneret into a quenching atmosphere, for example, air or nitrogen maintained at room temperature, and wound up.

As the term is used herein in the description of the fiber, "as-spun" means that the fiber has not been drawn or heat treated after extrusion and normal windup.

The as-spun fibers of this invention can be subjected to heat treatment in an oven to provide high strength fibers useful for a variety of industrial applications, such as plastic and rubber reinforcement. In the heat treating process, fiber samples, as skeins or on bobbins, preferably collapsible, Teflon ®-coated, stainless-steel bobbins, are usually heated under various restraints in an oven that is continuously purged by flow of inert gas to remove by-products from the vicinity of the fiber. Temperatures approaching the fusion point, but sufficiently below to prevent interfilament fusion, are employed. Preferably, the maximum treatment temperature is reached in a stepwise fashion.

Inherent viscosity ($\eta_{inh}$) is defined by the commonly used equation:

$$\eta inh = \ln(\eta_{rel})/C$$

wherein $\eta_{rel}$ is the relative viscosity and C is the concentration of polymer in the solvent (0.5 g/100 mL). The relative viscosity ($\eta_{rel}$) is determined by dividing the flow time, in a capillary viscometer, of the dilute solution by the flow time, in the same capillary viscometer, for the pure solvent. Flow times are determined at 30° C., and the solvent is a mixture of, by weight, 7.5% trifluoroacetic acid, 17.5% methylene chloride, 12.5% dichlorotetrafluoroacetone hydrate, 12.5% perchloroethylene and 50% p-chlorophenol.

Fiber tensile properties are reported herein in conventional units, with the corresponding SI units in parentheses.

| | |
|---|---|
| Denier: | 9/9000 m (1.11 dtex) |
| Tenacity: | g/denier (0.89 dN/tex) |
| Elongation: | percent of unstretched length |
| Modulus: | g/denier (0.89 dN/tex) |

Measurements were made using established procedures, such as disclosed in U.S. Pat. No. 3,827,998, on fibers that had been conditioned for at least one hour. At least three breaks were averaged. The commonly used Thermooptical Test (TOT), as described, for example, in U.S. Pat. No. 4,066,620, was used and involves heating a polymer sample between crossed (90°) polarizers on the heating stage of a polarizing microscope. Polymers that pass this test (+) are considered to be optically anisotropic in the molten state. The orientation angle was determined according to established procedures, such as disclosed in U.S. Pat. No. 3,671,542.

The following examples are illustrative of the invention. All temperatures are in degrees Celsius unless otherwise indicated.

Table 1 which follows summarizes the homopolyesters and copolyesters prepared in the examples. All symbols have the same meanings as defined in the aforesaid formulas. The table discloses which phenylene isomer was employed, that is, meta- or para- for the Ar group.

TABLE 1

A. Homopolyesters of a single species of (a); Example 4

| Prep'n. | $R^1$ | $R^2$ | Ar |
|---|---|---|---|
| P | Cl | Cl | m- |

B. Copolyesters of two species of (a); Example 3

| | (a)$^1$ | | | | (a)$^2$ | | |
|---|---|---|---|---|---|---|---|
| Prep'n. | $R^1$ | $R^2$ | Ar | mol % | $R^1$ | $R^2$ | Ar | mol % |
| M | Cl | Cl | p- | 50 | H | H | m- | 50 |
| N | Cl | Cl | p- | 67 | H | H | m- | 33 |

C. Copolyesters of a single species of (a) and a single species of (b); Examples 1A and 2

| | (a) | | | | (b) | | |
|---|---|---|---|---|---|---|---|
| Prep'n. | $R^1$ | $R^2$ | Ar | mol % | $R^3$ | $R^4$ | mol % |
| A | $CH_3$ | $CH_3$ | m- | 50 | H | H | 50 |
| B | Cl | Cl | m- | 50 | H | H | 50 |
| C | H | H | m- | 56 | H | H | 44 |
| D | $CH_3$ | $CH_3$ | p- | 50 | H | H | 50 |
| E | Cl | Cl | p- | 50 | H | H | 50 |
| F | H | H | p- | 56 | H | H | 44 |
| G | $CH_3$ | $CH_3$ | m- | 50 | $CH_3$ | $CH_3$ | 50 |
| H | $CH_3$ | $CH_3$ | m- | 50 | Cl | Cl | 50 |
| I | Cl | Cl | m- | 52 | $CH_3$ | $CH_3$ | 48 |
| J | Cl | Cl | m- | 55 | Cl | Cl | 45 |
| K | Cl | Cl | p- | 73 | H | H | 27 |

EXAMPLE 1

Copolyesters of 3- or 4-Carboxy-4'-hydroxybenzophenones and 4-Hydroxybenzoic Acid A. Copolyesters A-F of Table 1C were prepared using the following procedure. To a glass reactor equipped with a nitrogen inlet and sidearm were added the reactants shown in Table 2. The mixture was heated in a nitrogen atmosphere for about 8 hours at 283°, removed from the reactor and ground in a Wiley mill at liquid nitrogen temperature until the particles passed through a 20 mesh screen (U.S. Sieve Series), then reheated for a further 8 hours at 283°. The resulting polyesters had the properties given in Table 3; all passed the TOT test (+).

TABLE 2

| | (a) | | | (b) | | |
|---|---|---|---|---|---|---|
| Prep'n. | Structure* | Wt (g) | mmols | Structure* | Wt (g) | mmols |
| A | 1 | 1.74 | 5.6 | 7 | 0.98 | 5.4 |
| B | 2 | 1.78 | 5.0 | 7 | 0.90 | 5.0 |
| C | 3 | 1.78 | 6.3 | 7 | 0.90 | 5.0 |
| D | 4 | 1.74 | 5.6 | 7 | 0.98 | 5.4 |
| E | 5 | 1.78 | 5.0 | 7 | 0.90 | 5.0 |
| F | 6 | 1.78 | 6.3 | 7 | 0.90 | 5.0 |

*1 = 3-carboxy-3',5'-dimethyl-4'-acetoxybenzophenone
2 = 3-carboxy-3',5'-dichloro-4'-acetoxybenzophenone
3 = 3-carboxy-4'-acetoxybenzophenone
4 = 4-carboxy-3',5'-dimethyl-4'-acetoxybenzophenone
5 = 4-carboxy-3',5'-dichloro-4'-acetoxybenzophenone
6 = 4-carboxy-4'-acetoxybenzophenone
7 = 4-acetoxybenzoic acid

TABLE 3

| Prep'n. | Inherent Viscosity* | PMT (°C.)* | FT (°C.)* |
|---|---|---|---|
| A | 0.35 | 385 | 210 |
| B | i | — | 360 |
| C | 0.35 | 388 | 284 |
| D | i | — | 242 |
| E | i | — | 275 |
| F | i | — | 325 |

*i = insoluble
PMT = polymer melt temperature
FT = flow temperature

B. The copolyesters from Part A were mechanically melt spun using spinnerets having a single 0.23 mm diameter hole, at spinneret temperatures of 325° to 335°, and the fibers were wound up at speeds of 1250 to 1600 m/min and exhibited deniers of 7 to 7.5 (Table 4). Tensile properties of single filaments of these fibers were measured at room temperature, as-spun (1) and after heat treatment on a bobbin, under restraint, in a nitrogen atmosphere at 205° to 300° C. for periods of up to 30 hours (2). Properties given in Table 5 represent the average of five 2.54 cm breaks.

TABLE 4

| Prep'n. | Spinneret Temperature (°C.) | Wind-Up Speed (m/min) | Denier |
|---|---|---|---|
| A | 325 | 1300 | 7 |
| B | 325 | 1300 | 7.5 |
| C | 325 | 1250 | 7 |
| D | 330 | 1400 | 7 |
| E | 325 | 1600 | 7 |
| F | 335 | 1300 | 7 |

TABLE 5

| Prep'n. | Fiber Treatment | Tenacity (g/d) | Elong. (%) | Modulus (g/d) |
|---|---|---|---|---|
| A | 1 | 4.1 | 6.2 | 295 |
|   | 2 | 15.8 | 3.8 | 425 |
| B | 1 | 4.0 | 3.9 | 385 |
|   | 2 | 17.4 | 4.1 | 400 |
| C | 1 | 4.5 | 2.2 | 310 |
|   | 2 | 17.8 | 3.5 | 450 |
| D | 1 | 4.2 | 3.7 | 410 |
|   | 2 | 17.0 | 2.0 | 500 |
| E | 1 | 4.3 | 4.0 | 375 |
|   | 2 | 17.9 | 3.9 | 440 |
| F | 1 | 4.0 | 3.8 | 475 |
|   | 2 | 17.8 | 2.5 | 490 |

EXAMPLE 2

Copolyesters G-K of Table 1C were prepared by the procedure described in Example 1A except that the reactants used were as shown in Table 6. The resulting polymers had the properties given in Table 7; all passed the TOT test (+).

TABLE 6

| Prep'n. | (a) Structure* | Wt (g) | mmols | (b) Structure* | Wt (g) | mmols |
|---|---|---|---|---|---|---|
| G | 1 | 1.45 | 4.6 | 4 | 0.94 | 4.5 |
| H | 1 | 1.45 | 4.6 | 5 | 1.12 | 4.5 |
| I | 2 | 1.78 | 5.0 | 4 | 0.95 | 4.6 |
| J | 2 | 1.78 | 5.0 | 5 | 0.99 | 4.0 |
| K | 3 | 2.12 | 6.0 | 6 | 0.39 | 2.2 |

*1 = 3-carboxy-3',5'-dimethyl-4'-acetoxybenzophenone
2 = 3-carboxy-3',5'-dichloro-4'-acetoxybenzophenone
3 = 4-carboxy-3',5'-dichloro-4'-acetoxybenzophenone
4 = 3,5-dimethyl-4-acetoxybenzoic acid
5 = 3,5-dichloro-4-acetoxybenzoic acid
6 = 4-acetoxybenzoic acid

TABLE 7

| Prep'n. | Inherent Viscosity* | PMT (°C.)* | FT (°C.)* |
|---|---|---|---|
| G | i | — | 305 |
| H | i | — | 244 |
| I | i | 285 | 210 |
| J | i | — | 200 |
| K | 0.40 | — | 254 |

*i = insoluble
PMT = polymer melt temperature
FT = flow temperature

EXAMPLE 3

Copolyesters M and N of Table 1B were prepared by the procedure described in Example 1A except that the reactants used were as shown in Table 8. The resulting polymers had the properties shown in Table 9; all passed the TOT test (+).

TABLE 8

| Prep'n. | (a) Structure* | Wt (g) | mmols | (b) Structure* | Wt (g) | mmols |
|---|---|---|---|---|---|---|
| M | 2 | 1.42 | 4.0 | 3 | 1.14 | 4.0 |
| N | 2 | 1.42 | 4.0 | 3 | 0.57 | 2.0 |

*2 = 4-carboxy-3',5'-dichloro-4'-acetoxybenzophenone
3 = 3-carboxy-4'-acetoxybenzophenone

TABLE 9

| Prep'n. | Inherent Viscosity | PMT (°C.)* | FT (°C.)* |
|---|---|---|---|
| M | 0.49 | — | 239 |
| N | 0.32 | — | 250 |

*PMT = polymer melt temperature
FT = flow temperature

EXAMPLE 4

Polyester P of Table 1A was prepared by the procedure described in Example 1A except that the reactants used were as shown in Table 10. The resulting polymer had the properties shown in Table 11 and passed the TOT test (+).

TABLE 10

| Prep'n. | Structure* | Wt (g) | mmols |
|---|---|---|---|
| P | 2 | 2.5 | 7.1 |

*2 = 3-carboxy-3',5'-dichloro-4'-acetoxybenzophenone

TABLE 11

| Prep'n. | Inherent Viscosity | PMT (°C.)* | FT (°C.)* |
|---|---|---|---|
| P | 0.45 | 284 | 310 |

*PMT = polymer melt temperature
FT = flow temperature

Best Mode for Carrying Out the Invention

The best mode presently contemplated for carrying out the invention is reflected by Examples 1 and 2.

Industrial Applicability

The applicability of polyester filaments of high tenacity is well known in the textile industry. The polyesters of this invention are especially useful in this industry.

Although the above description includes preferred embodiments of the invention, it is to be understood that there is no intent to limit the invention to the precise constructions herein disclosed and that the right is reserved to all changes and modifications coming within the scope of the invention as defined in the appended claims.

I claim:
1. Fiber-forming melt-spinnable polyester that is optically anisotropic in the melt and consists essentially of the following amounts of recurring units of the structural formulas:
(a) 25–100 mol %

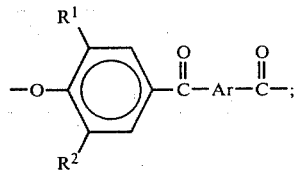

and
(b) 0–75 mol %

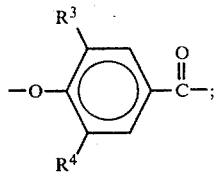

wherein
both of $R^1$ and $R^2$ are H, $CH_3$ or Cl or $R^1$ is H and $R^2$ is $CH_3$ or Cl;
both of $R^3$ and $R^4$ are H, $CH_3$ or Cl or $R^3$ is H and $R^4$ is $CH_3$ or Cl; and
Ar is m- or p-phenylene,
provided, however, when the amount of (a) is 90–100 mol %, Ar is m-phenylene in at least 30% of the (a) units, and provided further, however, when the amount of (a) is 100 mol % and only one species of (a) is present, $R^1$ and $R^2$ are both Cl, and provided still further, however, in copolyesters consisting essentially of two or more different species of (a), only one of said species is substituted and $R^1$ and $R^2$ therein are Cl.
2. Homopolyester of claim 1.
3. Copolyester of claim 1.
4. Copolyester of claim 3 containing units of (b).
5. Copolyester of claim 4 containing 40–60 mol % units of (b).
6. Copolyester of claim 4 wherein the unit of (b) is oxybenzoyl.
7. Filament of the copolyester of claim 3.
8. Shaped article of the copolyester of claim 3.
9. Film of the copolyester of claim 3.

* * * * *